Figure 1:
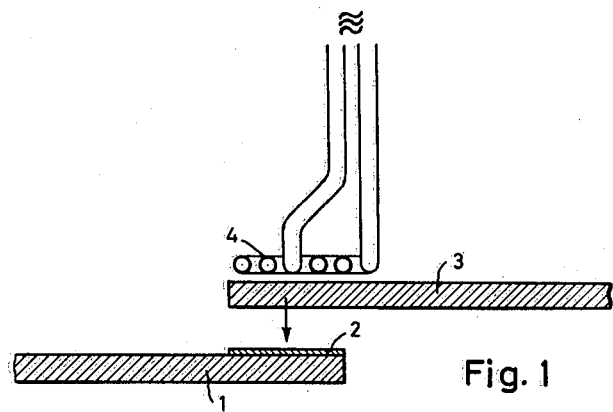

April 9, 1963 W. RÖSSNER 3,085,141
HARD-SOLDERING METHOD, PARTICULARLY FOR
JOINING NUCLEAR-REACTOR COMPONENTS
Filed July 5, 1960

3,085,141
HARD-SOLDERING METHOD, PARTICULARLY FOR JOINING NUCLEAR-REACTOR COMPONENTS
Wolfgang Rössner, Nurnberg, Germany, assignor to Siemens-Schuckertwerke Aktiengesellschaft, Berlin-Siemensstadt and Erlangen, Germany, a corporation of Germany
Filed July 5, 1960, Ser. No. 40,964
Claims priority, application Germany July 2, 1959
6 Claims. (Cl. 219—9.5)

My invention relates to a method for producing hard-solder joints, particularly between structural components of nuclear reactors.

According to conventional hard-soldering practice, both of the structures to be soldered together are first heated, for example by a flame or electric induction. After the required temperature is reached, the solder substance, in most cases, is supplied to the joint; but the solder substance may be also previously deposited at favorable locations of the junction to be produced. To prevent burn-off, the soldering location is enveloped by liquid, solid or gaseous reducing substances. As a rule, the period of time required for heating and soldering is of no particular concern.

However, not all materials can be soldered with the same ease, it being often necessary to use special solder substances and special de-oxidizing substances or fluxes for obtaining a joint of the desired strength. There are also cases where a soldered junction, at first satisfactory, becomes fatigue-fractured by prolonged alternating stresses. In many instances such has been found to be due to progressive embrittlement of the transition texture between the soldering substance and the base material. This occurs, for example, at the hard-solder junction between a zircon compound or alloy, such as known in the trade as Zircaloy 2, with stainless steel, using pure silver as solder. Such a hard-solder junction is often used in nuclear-reactor technology.

It is an object of my invention to obtain permanently strong, hard-solder junctions between structural metal components, particularly those of a nuclear reactor, even though, normally, the solder and one of the base materials tend to form an embrittling transition.

According to my invention, I proceed by first providing one of the two structural components with a fast-adhering coating of solder material under non-reactive conditions, then heating the other structural component to a temperature somewhat above the melting point of the solder, and thereafter placing the heated component in intimate thermal contact with the solder-coated component while the latter is still cold.

This method is based upon the recognition that, if a brittle intermediate texture between solder layer and base material is inevitable, such intermediate texture must be kept as thin as possible. This requires the shortest possible soldering or dwelling periods during which the solder is in the liquid phase. Consequently, the time during which the solder, deposited at any suitable location, is in liquid condition, must be avoided or minimized as much as possible, and this also applies to the diffusion periods.

There are several ways of uniformly distributing the silver solder, prior to the soldering operation proper, over the area of the solder junction to be produced, without causing it to enter into a metallurgical compound or alloy with the base material. One way, for example, is to produce the coating of solder material galvanically, i.e. by electroplating. Another way is to deposit the solder material by vaporizing or spraying (atomizing) it upon the surface of the structure to be coated. It is essential that the solder substance is thus coated onto the one structural component that tends to form with the solder a transition texture of the above-mentioned undesired properties. The other structural component is thereafter heated to a temperature higher than the melting temperature of the solder and then is used like a soldering iron by placing it into heat-conductive contact with the cold component already coated with solder substance. Due to the resulting heat exchange, the solder coating then melts immediately and thus produces the solder joint. However, the energy content or heat capacity in the solder-coated component is so dimensioned that the temperature of the two joined components declines very rapidly. This excludes the possibility that a relatively thick intermediate layer is formed by prolonged diffusion of the solder substance into the components, or by diffusion of the two base materials into each other.

Since the required degree of temperature, depending upon the melting point of the solder, cannot be varied to an appreciable extent, it is necessary to correspondingly choose the geometric dimensions of the structural components to be joined, relative to each other.

The soldering operation, according to the invention, of course, may also require the use of a fluxing agent and the provision of vacuum or of a protective gas which envelopes the components without eddy formation during the hard-soldering operation. An activation of the surfaces to be soldered may also be desirable.

It is preferable to heat the second structural component by electric induction. However, such heating to the necessary temperature may also be effected by directly passing electric current through the component or by applying flame heating.

Figure 2:
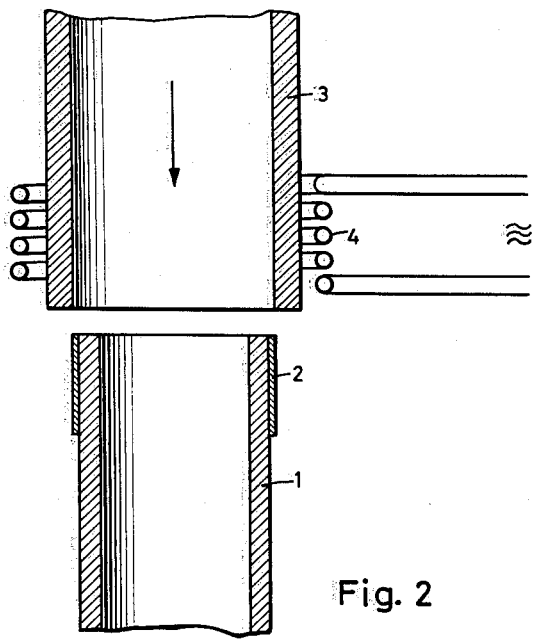

Two examples of the above-described method of my invention will be further described with references to FIGS. 1 and 2 of the accompanying drawing, each showing in cross section two components to be joined by hard soldering.

According to FIG. 1, two flat metal pieces 1 and 3 are to be joined together by hard soldering. The component 1 may consist of Zircaloy, which is apt to form the above-mentioned brittle intermediate texture when using silver as soldering material. The solder material 2 forms a coating on the area of component 1 to be contacted and joined with the component 3.

The component 3, consisting for example of stainless steel, is heated to the necessary soldering temperature above the melting temperature of the silver solder 2. This is done by means of a spiral shaped inductor coil 4 which is supplied with alternating current of sufficiently high frequency. After the component 3 has reached the soldering temperature, this component is moved in the direction of the arrow towards the component 1 and is pressed together therewith by means of a suitable jig (not illustrated), the pressure being approx. 1–4 kg. If necessary, the soldering operation is performed within a protective gas atmosphere, the necessary enclosure being conventional and not illustrated. The use of a fluxing agent may be sufficient, if the work-piece is allowed to be treated subsequently.

In the example of FIG. 2, no device for pressing the two structural components against each other is needed because in this case the two components 11 and 13 to be joined are tubular and dimensioned for telescopic inter-engagement. The inner tube 11 consists of the material which, if heated for a prolonged period of time in contact with the solder material, would form the detrimental intermediate layer. The tube 11 is shown to have a solder coating deposited on its upper end to be joined with the outer tube 13. While the coated tube 11 is kept in cold condition, the outer tube 13 is heated by an electric induction heater 14. After the soldering temperature is reached, the tube 13 is pushed over the coated portion of the tube 11. The immediately commencing cooling of tube 13 causes shrinking of its diameter so that a joint is produced by shrinking and simultaneously hard-soldering. By corresponding choice of the outer and inner diamter of the tubes to be joined—the outer diameter of tube 11, for instance, will be about 2/10 mm. larger than the inner diameter of tube 13—the contact pressure caused by shrinking can be modified. In this manner the strength of the resulting solder joint can be controlled by proper choice of the starting temperature of component 13, as well as by choice of the structural dimensions of the two components. The soldering according to the second example is preferably performed within a protective atmosphere, the necessary devices being conventional and for that reason not illustrated.

This method may be used for the elongation of zirconium pressure tubes of nuclear reactors, the diameter of which is about 100 mm. and the thickness about 1 to 2 mm. Generally the soldering time will be about one second or shorter and depends upon the heat conducting ratio of the different components.

In a solder junction made in accordance with the above described method of my invention, any brittle intermediate texture is so extremely thin that no detriment is encountered during subsequent use of the soldered components. To be sure, the transitional texture between the solder substance and the originally hotter component, the latter having functioned as a "soldering iron," is thicker, but is less detrimental or not injurious at all because of the different characteristics of that component.

The temperature of the "soldering iron" may be about 1200° C. and is determined by the dimensions and the specific heat of the different components.

A common rule can be stated: The heat content of the "soldering iron" is the sum of the heat contents of all parts of the junction, including the melting heat of the soldering substance at the beginning of the liquid phase of the solder. In addition, it can be stated that the volume of the "soldering iron" is larger than the sum of the volume of the other components of the junction.

While the invention is particularly advantageous for high-temperature structural components of nuclear reactor plants, it can be used analogously for other metals whose solder joints are susceptible to damage due to embrittlement or other deterioration caused by the transitional texture between the solder substance and one of the components. Such materials are e.g. titanium and nickel, in which case nickel functions as the "soldering iron."

The method of the invention is furthermore particularly well suitable in cases where the soldering gap would otherwise be too narrow to secure a proper penetration of the solder substance.

I claim:
1. The method of producing a hard-solder joint between two structural metal components, particularly of a nuclear reactor, which comprises the steps of depositing a solder coating upon the junction surface of a first one of the two components by reaction-free deposition, heating the second component to a temperature above the melting point of the solder coating, placing the heated second component in intimate contact with the coated area of said first component with the latter initially in cold condition and simultaneously discontinuing the heating of said second component, whereby the resulting hard-solder bond has an extremely thin transition texture between the solder and the material of said first component.

2. In the soldering method according to claim 1, the step of depositing said solder coating upon said first component by electroplating.

3. In the soldering method according to claim 1, the step of heating said second component by electric induction and joining the two components in a protective gas atmosphere.

4. The method of producing a hard-solder joint between two structural metal components of tubular shape of which one is to be fitted into the other, comprising the steps of depositing a solder coating upon a peripheral junction area of the narrow one of said tubular components, heating the wider component to a temperature above the melting point of the solder coating, placing the heated second component into telescopic engagement with the narrow component at said coated area with said narrower component in initially cold condition, and immediately permitting said wider component to cool and shrink, whereby a soldered shrinkage joint is produced.

5. The method of producing a hard-solder joint between two structural metal components consisting of zirconium alloy and steel respectively, which comprises the steps of depositing a silver coating upon the junction area of a first one of said components at a coating temperature of the area below that required for reaction of the silver with the material of said first component, heating the second component to a temperature above the melting point of silver, placing the heated component in intimate contact with the coated area of said first component with the latter initially in cold condition and simultaneously discontinuing the heating of said second component.

6. The method of producing a hard-solder joint between two structural metal components, particularly of a nuclear reactor, which comprises the steps of depositing a solder coating upon the junction surface of a first one of the two components by reaction-free deposition, heating the second component to a temperature above the melting point of the solder coating, placing the heated second component in intimate contact with the coated area of said first component with the latter initially in cold condition and discontinuing the heating of said second component while the first component is still in cold condition.

References Cited in the file of this patent
UNITED STATES PATENTS

| | | |
|---|---|---|
| 2,879,587 | Muschovic | Mar. 31, 1959 |
| 2,914,641 | Yuhasz | Nov. 14, 1959 |
| 2,920,171 | Thein-Chi et al. | Jan. 5, 1960 |
| 2,966,571 | Markert | Dec. 27, 1960 |